Oct. 23, 1956  L. K. DE LAUBAREDE  2,767,431
METHOD AND APPARATUS FOR PROVIDING A PERMEABLE
TUBE WITH AN IMPERMEABLE LINING
Filed Sept. 7, 1954  2 Sheets-Sheet 1
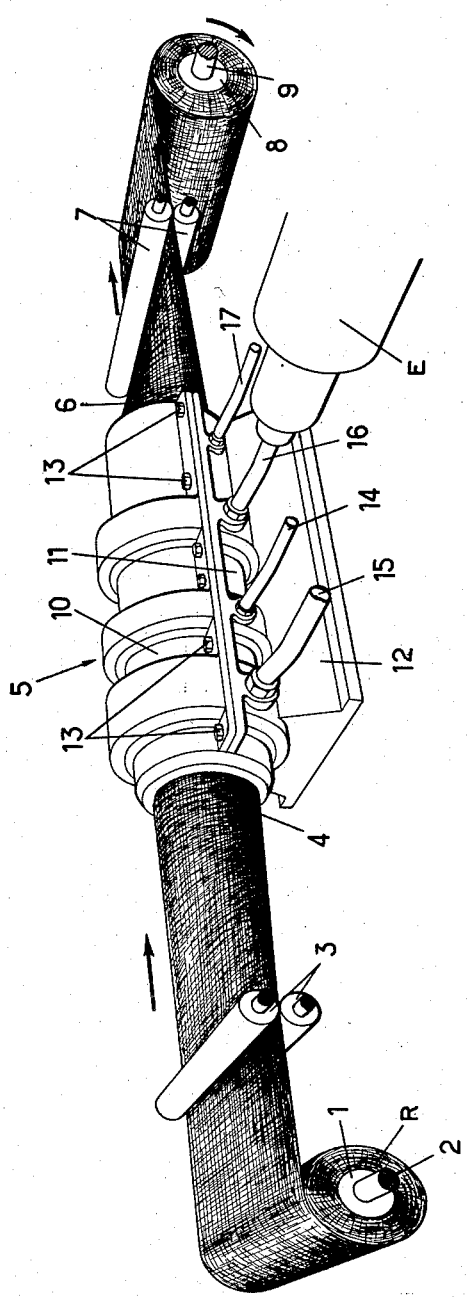
INVENTOR
Leonce Kraffe de Laubarede
BY: Holcomb, Wathenille Brisebois
ATTORNEYS

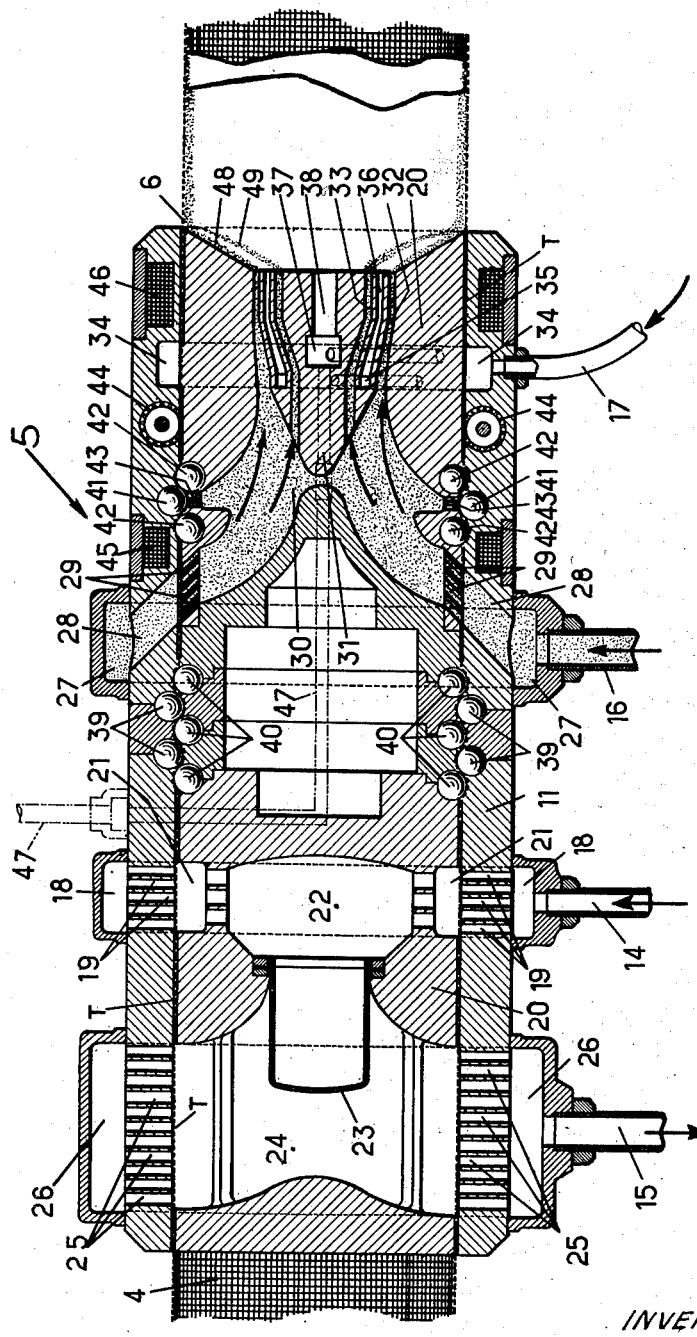

United States Patent Office 2,767,431
Patented Oct. 23, 1956

2,767,431

METHOD AND APPARATUS FOR PROVIDING A PERMEABLE TUBE WITH AN IMPERMEABLE LINING

Léonce Kraffe de Laubarede, Paris, France

Application September 7, 1954, Serial No. 454,573

Claims priority, application France September 10, 1953

15 Claims. (Cl. 18—13)

The object of this invention is to provide a permeable tube, whether flexible or not, with an impermeable lining integral therewith. The process is characterized by the steps of passing a thermoplastic material heated to a suitable temperature through the walls of a tube to its interior, then removing any excess plastic material from the tube, and then blowing, by a process already known in itself, one or more tubes formed of this plastic material and guiding them against the interior of the permeable tube to render it impermeable while subjecting them to air pressure so that the blown tube becomes attached to and adheres to the impregnated material of the permeable tube so as to render it impermeable.

The process forming the subject matter of my invention is especially useful for rendering impermeable a continuous woven tube, of jute, for example, and in this instance, means for removing dust by air blowing and suction is preferably provided before impregnation of the tube. The tube is continuously advanced and a thermoplastic material maintained at a suitable temperature is passed through the walls of the tube. The excess of the thermoplastic material impregnating the fabric is then removed, air is blown through the tube to be rendered impermeable and this air is so directed as to form from the thermoplastic material in the interior of the woven tube one or more thermoplastic tubes in such a way that they become attached to and adhere to each other and to the inner walls of the tube to be rendered impermeable. It should be noted that the current of compressed air which is blown through the tube to be rendered impermeable may be introduced either before or after the zone in which the thermoplastic material is admitted. In the latter case, means should be provided to perforate the tube to be rendered impermeable which has been ridded of all excess of thermoplastic material.

The process forming the subject matter of this invention whether applied to tubes woven of material or artificial textile fabric may in either case comprise an initial treatment designed to facilitate the adherence of the thermoplastic material to the fabric of the tube to be rendered impermeable when the woven tube has not been previously cleansed of lubricating material used in its manufacture.

The process forming the subject matter of the invention is equally applicable to metallic clothes in tubular form and to all tubular elements having pores or perforations.

Another object of the invention is the provision of a new device which constitutes an apparatus for supplying a tube of permeable material with an interior lining comprising one or more layers of a thermoplastic material suitable for insuring its impermeability. This apparatus is characterized by the fact that it comprises, in combination with means for continuously advancing a tube, means for feeding a suitable thermoplastic material through the walls of the tube to its interior, means for removing the excess of thermoplastic material with which the tube was impregnated during its passage, means for producing a current of compressed air through the walls of the tube to be rendered impermeable, extrusion means of a known type for receiving and guiding the aforesaid thermoplastic material and the compressed air so as to obtain one or more tubes of this thermoplastic material, these blown tubes attaching themselves and adhering together to the walls of the tube to render it impermeable.

Another object of the invention is the new article of manufacture which consists of a tube of permeable material rendered impermeable according to the process of the invention, as well as all products manufactured from this impermeable tubing, especially an impermeable packing sack having an adherent interior tubular lining of thermoplastic material, whether made of one or several tubular layers.

One means for carrying out my invention will now be described by way of illustration without limiting its scope, this means being described by way of example and schematically illustrated on the attached drawings, in which:

Figure 1 is a schematic perspective view of an apparatus for providing a continuous woven tube with an impermeable inner lining according to the invention; and Figure 2 is a partial axial cross-section of the apparatus shown in Figure 1, showing the means for blowing the impermeable tubular linings, preceded by dust removing means.

A flattened tube of jute cloth, for example, is designated on Figure 1 by the letter R, and is shown rolled on a cylinder 1 the axis 2 of which turns on supports not shown. On leaving the cylinder 1, the tube is gripped between guide rollers 3, then opened at 4 over a tubular cylindrical form and introduced into the assembly designated as 5 where it receives a tubular inner lining of thermoplastic material. The cylindrical tube 6 having been rendered impermeable leaves the assembly 5 and is closed by being flattened between the rollers 7 so that it may be rolled upon cylinder 8, the axis 9 of which may be rotated at a suitable speed by well known means not shown.

The assembly 5 comprises two like outer parts, an upper part 10 and a lower part 11 resting on a bed 12. Bolts 13 connect the parts 10 and 11.

A compressed air outlet is designated by reference numeral 14, an air suction duct by 15, and by 16 a pipe for admitting a homogeneous thermoplastic material at a suitable temperature and issuing from a head on the extruding machine E. A tube 17 brings the necessary compressed air to blow the thermoplastic material into a tubular form as will be seen hereafter.

As seen in Figure 2, the inlet 14 opens into an air distributing chamber 18 provided with small ducts 19 which extend to the surface of the tube T which is to be rendered impermeable and is positioned on a substantially cylindrical interior assembly 20, which serves as a mandrel and, as shown in the drawings, substantially blocks that portion of the permeable tube which is about to emerge from the machine, leaving only the passageways hereinafter described for extrusion of the rings of thermoplastic material and the admission of compressed air to expand said rings. The tube to be rendered impermeable passes between the assembly 20 and the parts 10 and 11 when the apparatus is in operation. The air from the ducts 19, after having passed through the walls of the tube 7 arrives in an annular first chamber 21 separated by small ducts from an axial chamber 22, closed by a sack 23 forming a filter. The filtered air then passes through a chamber 24, crosses again through the walls of the tube T and passes by way of small ducts 25 into a chamber 26 from which it is sucked out through the tube 15. The inlet 16 for thermoplastic material opens into an annular chamber 27, extends through openings 28 through the walls of the tube T, then by way of the small ducts 29 of the assembly 20 into an axial chamber 30 where the plastic material is guided by a die 31 fixed to a part 32 in the form of a ring. The plastic material runs between the die 31 and the ring 32 and, eventually, also through orifices 33 evenly spaced about its axis emerging as a plurality of concentric rings.

Compressed air from the inlet 17 arrives in a chamber 34 encircling the tube T and the assembly 20, then, through ducts provided in the ring 32 and the die 31, it arrives in an annular distributing chamber 35 which feeds ducts 36 and likewise in an axial chamber 37 which leads to the front of the head of the die 31 through a little duct 38. As the compressed air emerges from the ducts 32 and 36 it expands outwardly against the rings and forces them into engagement with the walls of the permeable tube on which form an impermeable inner lining.

The tube T is gripped between the parts 10 and 11 on the one hand and the assembly 20 on the other hand by means of guide rollers designated by reference numeral 39 for those mounted on the parts 10 and 11 and by 4 for those mounted on the assembly 20. Like guide rollers designated by 41 and 42 squeeze from the tube T all excessive plastic material impregnating this tube T and may be expelled into the chamber 30 through the small ducts 43. In order to facilitate the passage of air entering through the inlet 17 through the tube T, toothed rotary members 44 are provided which make perforations in this tube. These rotary members 44 may be dispensed with if instead of the inlet 17 an air inlet is provided which is positioned in advance of the point at which the plastic material comes in.

Heating means for maintaining the plastic material at a suitable temperature are shown schematically at 45 and 46.

The direction in which the tube T moves during operation of the apparatus (from left to right) is indicated by arrows on the drawings. As seen in Figure 2, the tubes 48 and 49 have been formed by blowing and having just come together and are sticking to each other, tube 48 having the large diameter adhering tightly to the interior of the tube T with which it is becoming closely united.

While only a single device for rendering a flexible tube impermeable according to the process of my invention has been described, this process may be used to render a rigid tube impermeable. In this case, squeezing means adapted to grip the tube T, without deforming it, are provided and certain of the outer squeezing means are rotatably driven to assure the advancement of the tube T. On the other hand, in order to maintain the air pressure required for the expansion of the tubes of plastic material such as 48 and 49, inside of a rigid tube, it is possible to utilize a piston of the type described in applicant's French application filed April 22, 1954, for an "Apparatus for the Continuous Manufacture of Tubes of Thermoplastic Material."

It will be understood that various changes, improvements, or additions may be made to the method of carrying out the invention described herein and that certain mechanical parts may be replaced by equivalent parts without departing from the spirit of the invention.

I claim:

1. A process for providing a permeable tube with an impermeable inner lining integral therewith, said process comprising the steps of continuously advancing said permeable tube, passing a thermoplastic material from the exterior into the interior of said permeable tube through the walls thereof and extruding it as a ring within said permeable tube while blocking off that portion of the tube through the walls of which thermoplastic material has not yet been passed, closing said permeable tube at a point some distance beyond that at which said thermoplastic material is extruded as a ring so as to form a closed tube section into which said plastic is being extruded, directing air under pressure into the center of said permeable tube within said ring of thermoplastic material and thereby expanding said ring to form an interior impermeable lining of thermoplastic material forced into contact with the interior of said permeable tube so that it adheres thereto and becomes integral therewith.

2. A process as claimed in claim 1 in which said plastic material is extruded in a plurality of concentric rings and said air under pressure is directed into the space between said rings as well as into the center of said permeable tube so as to form a plurality of coaxial impermeable linings of thermoplastic material and cause them to adhere to each other and to the interior of the permeable tube.

3. A process according to claim 1 in which said permeable tube is made of a flexible textile material.

4. A process according to claim 1 in which said permeable tube is made of a rigid perforated material.

5. Apparatus for providing an impermeable lining for a tube of permeable material comprising in combination means for continuously advancing said permeable tube, means for forcing a suitable thermoplastic material through the walls of said permeable tube from its exterior to its interior, means for removing any excess of thermoplastic material adhering to said tube of permeable material, means for introducing air under pressure into the center of said tube of permeable material, means within said tube for extruding said thermoplastic material in the form of a ring concentric with said tube adapted to be expanded by said air under pressure to form an inner lining of thermoplastic material pressed against the inside of said tube.

6. Apparatus as claimed in claim 5 in which said extrusion means comprises a die having orifices from which said thermoplastic material is extruded in concentric rings and said means for introducing air under pressure directs said air into the space between said rings as well as into the center of said tube.

7. Apparatus for providing an impermeable lining for a tube made of permeable material, said apparatus comprising in combination means for advancing said tube, a mandrel over which said tube is advanced, at least one pipe for carrying thermoplastic material leading to said mandrel and terminating short thereof by the thickness of said tube of permeable material, at least one registering duct in said mandrel leading from said pipe for carrying thermoplastic material to the interior thereof, an extrusion die positioned at the exit end of said mandrel and adapted to extrude said thermoplastic material in the form of a ring, at least one pipe for carrying compressed air leading to the exterior of said mandrel and stopping short thereof by the thickness of said tube of permeable material, at least one registering duct in said mandrel leading from said compressed air pipe through said extrusion die to the center of said tube so that air forced therethrough will expand said ring into an impermeable lining pressed against the interior of said tube, and means for closing said tube after it has passed off the mandrel, said mandrel being adapted to substantially block that portion of the permeable tube being advanced over it except for the passageways formed by said ducts.

8. Apparatus as claimed in claim 7 in which said mandrel carries rollers for squeezing any excess of thermoplastic material from said permeable tube after it has passed the pipe carrying the thermoplastic material to the mandrel.

9. Apparatus as claimed in claim 7 provided with a second pipe for carrying compressed air to said mandrel positioned on the input side of the other pipes, an additional duct in said mandrel leading to a hollow compartment within said mandrel separated from all of the other ducts in said mandrel previously mentioned, said hollow compartment having a filter dividing it into two parts, an additional duct in said mandrel leading from the other side of said filter to the exterior of the mandrel and a registering air suction pipe leading therefrom to a source of suction.

10. A process for continuously applying an impermeable inner lining to a permeable tube comprising the steps of disposing said tube about a mandrel and continuously advancing it therebeyond so that the first section of the tube is blocked as it passes over said mandrel and a second section beyond the mandrel remains open, passing a thermoplastic material through the permeable wall of said tube and extruding it into the second section thereof in the form of a ring concentric with said tube, passing air under pressure through the permeable wall of said tube and directing it into the second section thereof at a point within said ring of thermoplastic material and closing the end of said second section away from the mandrel so that air under pressure introduced into that section will expand outwardly and force said ring of thermoplastic material outwardly to engage and adhere as an impermeable lining to said permeable tube.

11. A process as claimed in claim 10 in which said plastic material is heated as it is being extruded.

12. A process as claimed in claim 10 in which cleaning air under pressure is forced through the walls of said permeable tube before the thermoplastic material is introduced thereto.

13. Apparatus for providing a cylindrical tube of permeable material with an impermeable inner lining, said apparatus comprising a cylindrical mandrel adapted to fit within and close one end of said tube, a tubular casing encircling said mandrel and adapted to press said tube thereagainst, registering passages in said casing and mandrel for the admission of plastic material through the walls of said permeable tube to the interior of the tube and for extruding it therein as a ring concentric with said tube, additional passages in said casing and mandrel for admitting air under pressure to the center of said tube through the walls thereof, rotatable guide means mounted in the opposing walls of said mandrel and casing, the guide means mounted in each of these walls extending into cooperating recesses in the opposite wall, means for flattening and closing the tube after it leaves the mandrel, and means for advancing the tube over the mandrel toward said flattening means.

14. Apparatus as claimed in claim 13 in which said casing is provided with heating means adjacent that portion of the mandrel traversed by the passages for admitting thermoplastic material to the interior of the tube.

15. Apparatus as claimed in claim 13 in which said rotatable guide means consist of ball bearings.

References Cited in the file of this patent

UNITED STATES PATENTS

| | | |
|---|---|---|
| 2,106,828 | Chappell | Feb. 1, 1938 |
| 2,160,371 | Schnabel | May 30, 1939 |
| 2,291,545 | Ganz et al. | July 28, 1942 |
| 2,320,564 | Brooks | June 1, 1943 |